United States Patent
Doten

(10) Patent No.: US 9,022,133 B2
(45) Date of Patent: May 5, 2015

(54) POLYMER MIXER POWERED BY HYDRODYNAMIC FORCES

(76) Inventor: Leonard E. Doten, Cold Springs, CA (US)

( * ) Notice: Subject to any disclaimer, the term of this patent is extended or adjusted under 35 U.S.C. 154(b) by 772 days.

(21) Appl. No.: 13/373,268

(22) Filed: Nov. 8, 2011

(65) Prior Publication Data

US 2013/0112907 A1 May 9, 2013

(51) Int. Cl.
| | |
|---|---|
| A62C 2/00 | (2006.01) |
| A62C 25/00 | (2006.01) |
| A62C 27/00 | (2006.01) |
| A62C 29/00 | (2006.01) |
| B01F 3/08 | (2006.01) |
| A62C 3/02 | (2006.01) |
| B64D 1/16 | (2006.01) |
| A62C 5/00 | (2006.01) |
| B01F 5/04 | (2006.01) |
| B01F 5/06 | (2006.01) |

(52) U.S. Cl.
CPC ............. *B01F 3/0865* (2013.01); *A62C 3/0242* (2013.01); *B64D 1/16* (2013.01); *A62C 3/0228* (2013.01); *A62C 5/002* (2013.01); *B01F 5/0415* (2013.01); *B01F 5/0428* (2013.01); *B01F 5/0648* (2013.01); *B01F 5/065* (2013.01)

(58) Field of Classification Search
CPC .... A62C 3/0228; A62C 3/0242; A62C 5/002; B64D 1/16
USPC ........... 169/14, 15, 44, 51, 52, 53, 54, 62, 70; 239/318, 399, 428, 432, 433; 252/2; 366/158.5
See application file for complete search history.

(56) References Cited

U.S. PATENT DOCUMENTS

| | | | | |
|---|---|---|---|---|
| 3,423,053 | A * | 1/1969 | Hawkshaw | 244/136 |
| 3,442,334 | A * | 5/1969 | Gousetis | 169/53 |
| 3,754,601 | A * | 8/1973 | Linkewich | 169/44 |
| 5,699,862 | A * | 12/1997 | Rey | 169/53 |
| 5,967,462 | A * | 10/1999 | Foster et al. | 244/136 |
| 6,003,782 | A * | 12/1999 | Kim et al. | 239/171 |
| 6,510,805 | B2 * | 1/2003 | Fima et al. | 111/100 |
| 7,717,356 | B2 * | 5/2010 | Petersen | 239/8 |
| 2003/0047327 | A1 | 3/2003 | Gilbert | |
| 2005/0178565 | A1 | 8/2005 | Voss | |
| 2010/0059237 | A1 * | 3/2010 | Cordani | 169/54 |

FOREIGN PATENT DOCUMENTS

| | | |
|---|---|---|
| JP | 11-197264 A | 7/1999 |
| WO | WO 03-031892 A1 | 4/2003 |

* cited by examiner

*Primary Examiner* — Ryan Reis
(74) *Attorney, Agent, or Firm* — Heisler & Associates

(57) ABSTRACT

Water is mixed with fire suppressant polymer in a mixer absent a power source. The mixer receives water through a water inlet with water exhibiting high velocity and associated hydrodynamic force. Such velocity is achieved by locating the water inlet connected to a float or other part of an aircraft so that when the aircraft flies over water with the float dipping into the water, water is driven through the opening and into the water inlet of the mixer. A polymer inlet passes into the mixer. A bend is located downstream of the water inlet and the polymer inlet. The bend exhibits sufficient resistance to fluid flow direction therethrough that the polymer is sheared and thoroughly mixed and activated with the water. A colorant inlet is optionally provided within the mixer and the water and polymer mixture is then discharged into a tank for later utilization at a firefighting location.

16 Claims, 4 Drawing Sheets

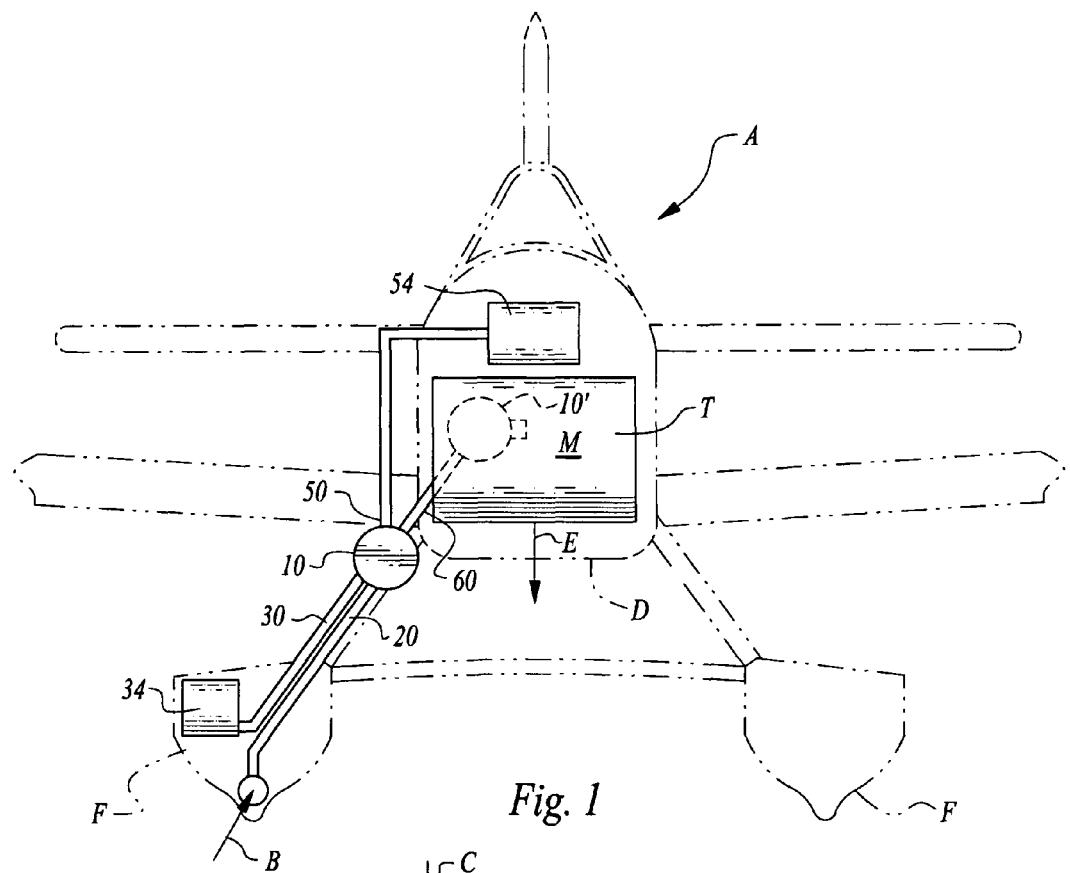
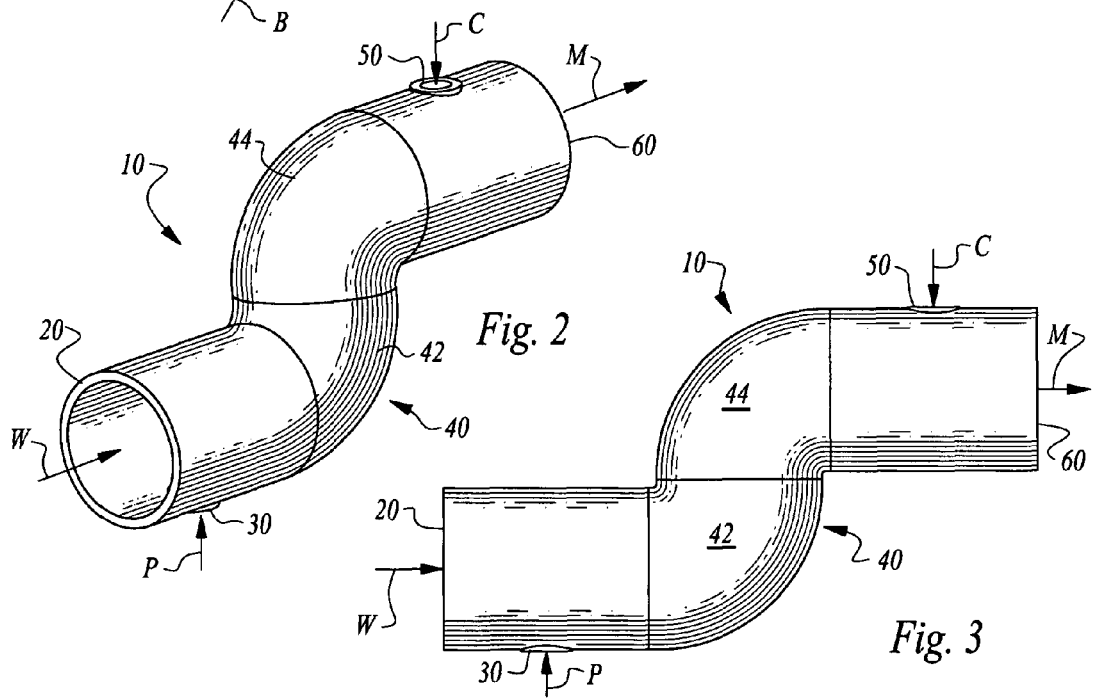
Fig. 1
Fig. 2
Fig. 3

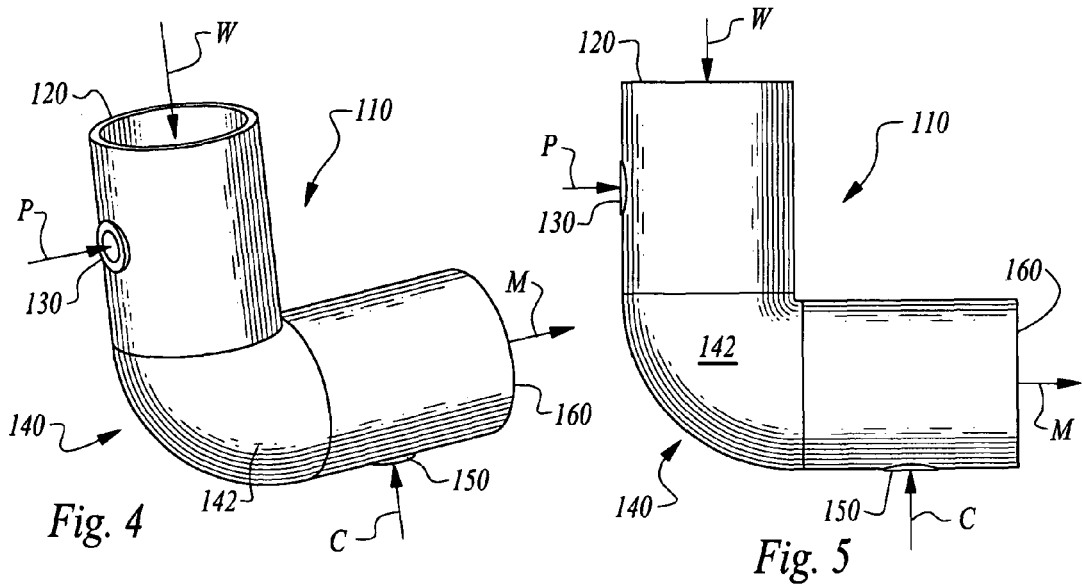
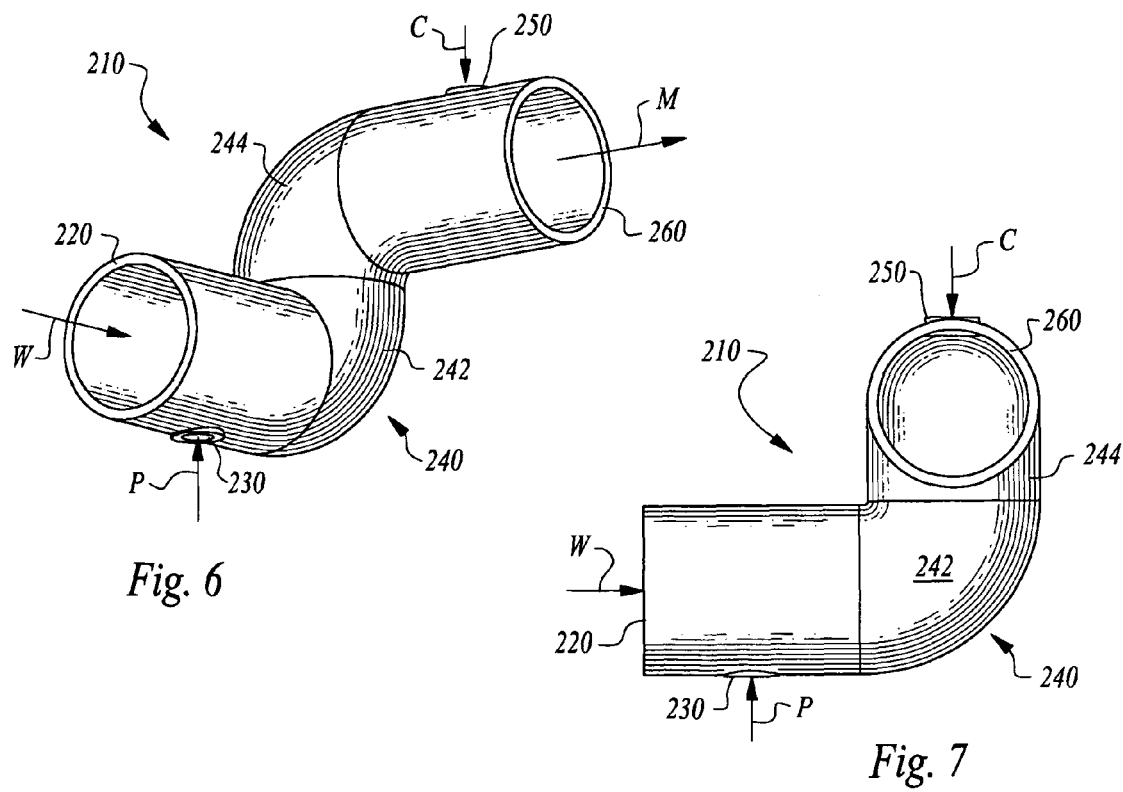

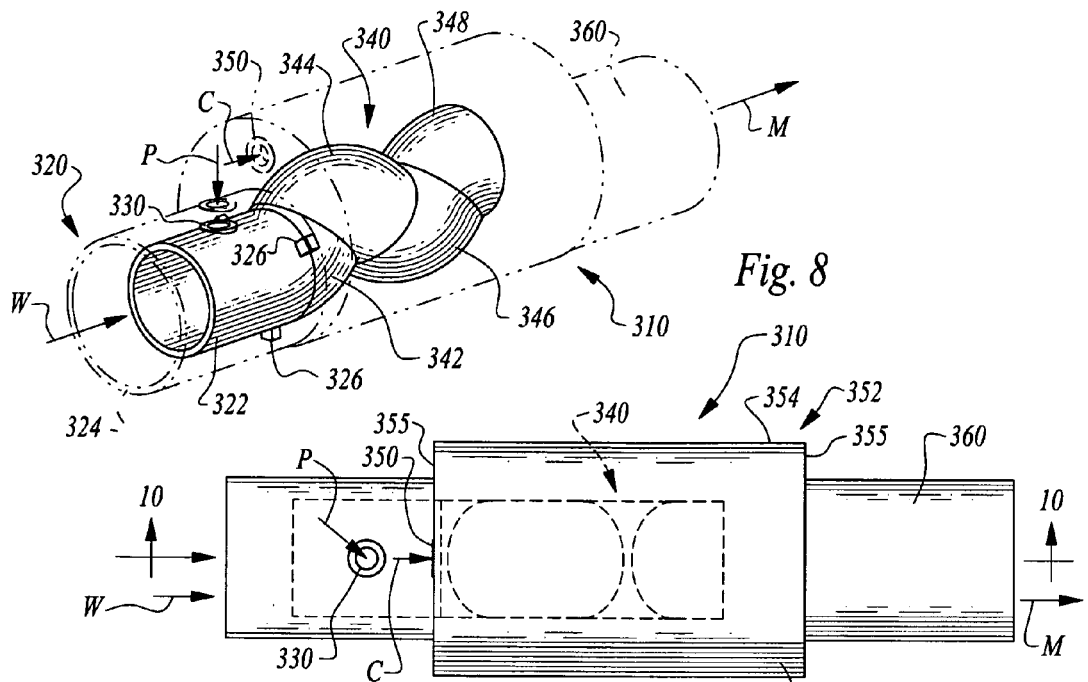
Fig. 8
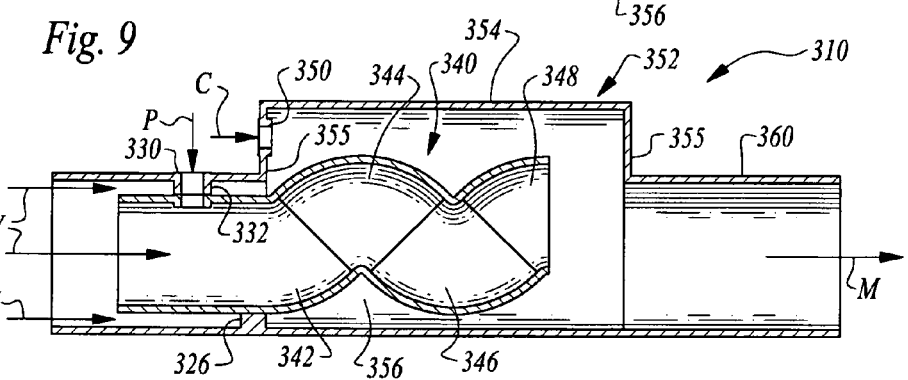
Fig. 9
Fig. 10
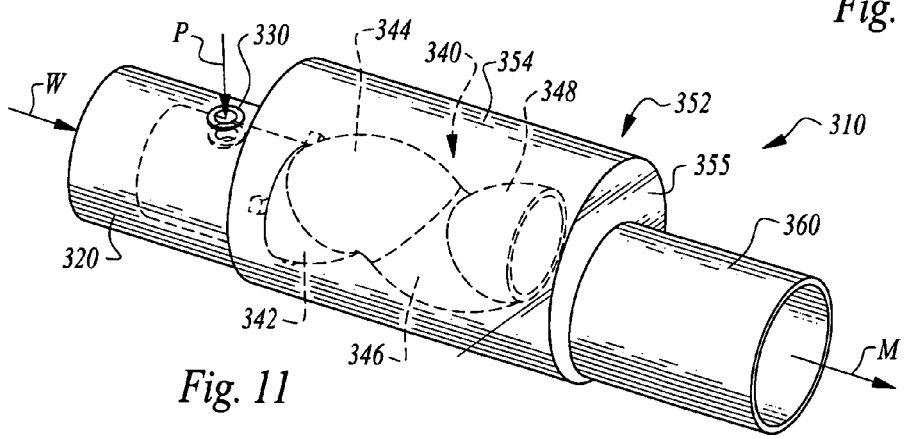
Fig. 11

POLYMER MIXER POWERED BY HYDRODYNAMIC FORCES

FIELD OF THE INVENTION

The following invention relates to mixers for polymer based wildland fire chemicals to cause the polymer to be adequately mixed and activated to maximize fire chemical effectiveness. More particularly, this invention relates to a water and polymer mixer which does not require a pump, but which is powered by hydrodynamic forces present within the water, such as when high velocity water flow through a fluid pathway is provided by directly accessing a body of water through a pickup on an airplane skimming over a surface of the body of water.

BACKGROUND OF THE INVENTION

When combatting wildfire from the air, various tools can be utilized. One common tool is to load an appropriately configured aircraft with wildland fire chemicals, fly the aircraft over the fire or an area adjacent the fire to be protected, and discharge the fire chemical from the aircraft. While such fire chemicals are quite effective in suppressing wildfire, the aircraft must travel to a reloading base and return to the location of the wildfire before additional loads can be dropped, decreasing the effectiveness of such aircraft proportional to the distance the reloading base is from the fire and the time such reloading takes.

In many instances bodies of water are available in the area where the wildfire is occurring. Helicopters can be utilized with buckets suspended therefrom which can be loaded with water and then flown to the site of the wildfire and released. Water is not as effective as fire retardants or suppressants in combatting wildfire. Also, helicopters have a lesser payload capacity than airplanes.

It is also known to utilize airplanes for dropping water onto wildfires. Such airplanes are configured to skim over a body of water to load tanks therein with water. Such airplanes then fly to the site of the fire where the water can be released.

Water's effectiveness as a fire suppressant can be significantly enhanced by adding a suppressant polymer to the water. One such polymer material is provided under the trademark FIREWALL II, provided by MGG, LLC of Carmichael, Calif. One unique characteristic of such polymer material is that merely adding the polymer material to water does not provide the full benefit of fire suppressant capacity to the water. Rather, the polymer must be thoroughly mixed with the water. Shearing forces associated with such thorough mixing cause the water to have the polymer fully activated and dispersed therein, so that the fire suppressant effect of the water can be maximized. A pump is typically used which provides the required shearing/mixing force to activate the polymer.

While it would be desirable to add polymer to water in a fire fighting aircraft, complexities associated with the required mixing to impart the highest fire suppressant effect on the water polymer mixture, requires appropriate polymer mixing equipment. Such equipment requires a relatively large amount of power and has significant weight. When a firefighting aircraft is being outfitted for firefighting, it is desirable that as much of the available payload capacity of the aircraft be utilized for carrying water and polymer, as possible. Known pumping equipment burdens the aircraft with extra weight thus minimizing effectiveness. Accordingly, a need exists for a method to mix polymer with water without requiring a powered mixer or pump.

SUMMARY OF THE INVENTION

With this invention a mixer is provided which does not require a separate power source or a pump, making such a mixer readily deployable on a firefighting aircraft. Such an aircraft would have tanks for temporary storage of water and polymer mixed therein as well as polymer supply tanks and preferably colorant supply tanks. A mixer according to this invention is provided downstream of a water inlet and a polymer inlet, with the mixer configured to mix the polymer and water before the mixed polymer and water enters the tank where it can later be dropped in firefighting.

The water inlet is to be deployed from a float (or other part of the aircraft) of an aircraft. This opening is configured on the float such that when the aircraft is flying over water with the float touching the water, water is caused to be rapidly drawn into the opening at exceptionally high velocity. The mixer is configured so that this high velocity water follows an abruptly turning pathway downstream of the polymer inlet. This abruptly turning pathway causes the polymer to exhibit shear when in contact with the water which causes the polymer to be fully activated and dispersed within the water to maximize the fire suppressant effect of the water and polymer mixture.

In a preferred embodiment this bending fluid pathway is fitted with a pair of elbows downstream of the water inlet and the polymer inlet. These elbows are preferably 90° elbows oriented in distinct directions. Water passing through these elbows is thus caused to turn in a first direction and then turn in a second direction while being forced through the elbows at high velocity. The diameter of the fluid pathway, the sharpness of the curving of the elbows, the orientation of the elbows relative to each other and the velocity of the water are selected so that the polymer in the water exhibits sufficient shear to be effectively dispersed and activated within the water after passing through these elbows. The water and polymer mixture can then be passed into a tank for storage until ready to be dropped from doors in the bottom of the tank.

OBJECTS OF THE INVENTION

Accordingly, a primary object of the present invention is to provide an apparatus for mixing polymer fire chemicals with water through hydrodynamic forces alone, and without requiring a separate mixer or pump.

Another object of the present invention is to provide a method for mixing water and fire chemicals together without requiring the weight and energy demands of a pump or dynamic mixer machine.

Another object of the present invention is to provide a polymer based fire chemical and water mixer interposable along a fluid pathway between a water inlet and a tank for water mixture, the mixer powered solely by hydrodynamic forces within the water.

Another object of the present invention is to provide a fire fighting aircraft configured to carry fire chemicals and gather water directly from a body of water, and mixing stored chemicals with water taken up from the body of water before storing a mixture of water and chemicals within a tank of the aircraft which can later be dropped at a fire fighting location.

Other further objects of the present invention will become apparent from a careful reading of the included drawing figures, the claims and detailed description of the invention.

BRIEF DESCRIPTION OF THE DRAWINGS

FIG. 1 is a front elevation partial schematic view of a fire fighting aircraft with a chemical tank, colorant tank and chemical mixer configured to add and mix chemicals with water before the water enters a tank of the fire fighting aircraft, according to this invention.

FIG. 2 is a perspective view of a chemical and water mixer according to a preferred embodiment of this invention.

FIG. 3 is a side elevation view of that which is shown in FIG. 2.

FIG. 4 is a perspective view of an alternative single elbow mixer according to an alternative embodiment of this invention.

FIG. 5 is a side elevation view of that which is shown in FIG. 4.

FIG. 6 is a perspective view of a non-planar chemical and water mixer providing an alternative embodiment of that which is shown in FIG. 2.

FIG. 7 is a side elevation view of that which is shown in FIG. 6.

FIG. 8 is a perspective view of a concentric polymer and water mixer with portions of the mixer shown in broken lines and portions of the mixer shown in solid lines.

FIG. 9 is a top plan view of that which is shown in FIG. 8 with interior portions thereof shown in broken lines and exterior portions thereof shown in solid lines.

FIG. 10 is a side full sectional view of that which is shown in FIG. 9 revealing interior details of the concentric mixer of this alternative embodiment.

FIG. 11 is a perspective view similar to that which is shown in FIG. 8 except that exterior structures are shown in solid lines and interior structures are shown in broken lines.

DESCRIPTION OF THE PREFERRED EMBODIMENT

Figures 12, 13, 14, 15:
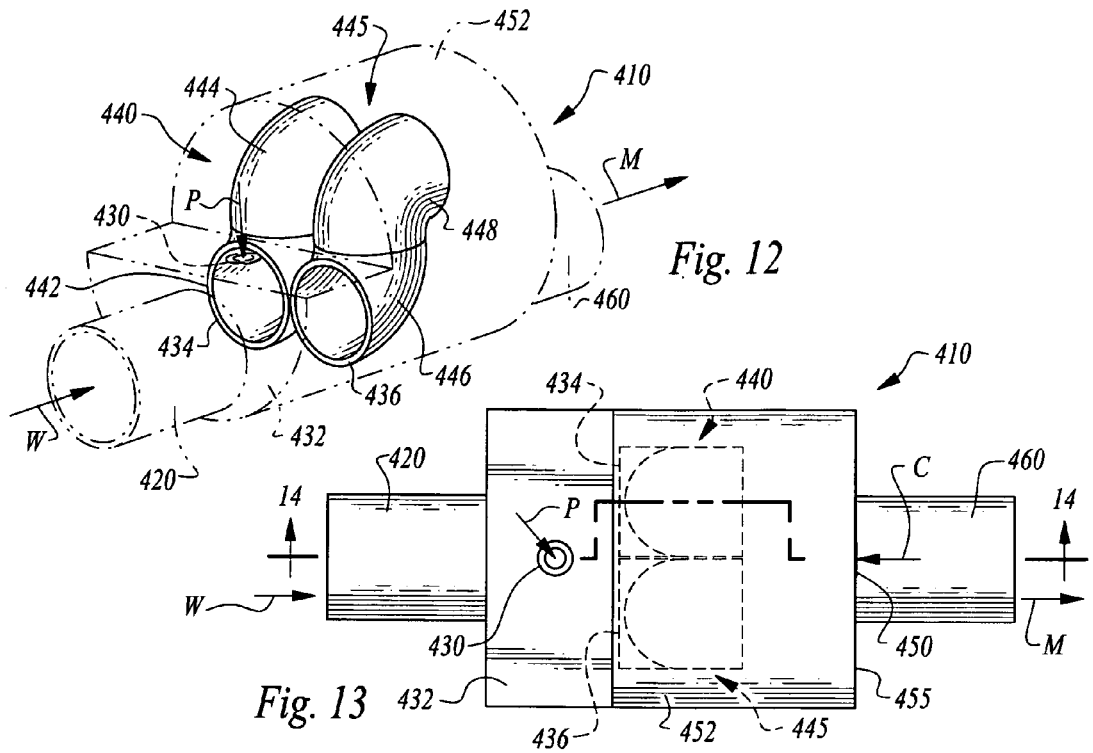
FIG. 12 is a perspective view of a tandem mixer according to a further alternative embodiment of this invention with interior structures shown in solid lines and exterior structures shown in broken lines.
FIG. 13 is a top plan view of that which is shown in FIG. 12 and with interior structures shown in broken lines.
FIG. 14 is a side full sectional view of that which is shown in FIG. 12, taken along line 14-14 of FIG. 13 and revealing interior details of this tandem mixer.
FIG. 15 is a perspective view of that which is shown in FIG. 12 with exterior details shown in solid lines and interior details shown in broken lines.

Referring to the drawings, wherein like reference numerals represent like parts throughout the various drawing figures, reference numeral 10 (FIGS. 1-3) is directed to a mixer for mixing fire chemical polymer P with water W. The mixer 10 does not require a power source, but rather is powered by hydrodynamic forces existing within the flow of water W through a water inlet 20 into the mixer 10. These hydrodynamic forces are sufficient, when driving the water W through the mixer 10 as configured according to this invention, to thoroughly mix and activate the polymer P so that the water and polymer mixture M is ready for maximum effectiveness in use at a firefighting location.

The mixer 10 is configured to reside upon an aircraft A (FIG. 1) with floats F configured to route water W directly from a body of water over which the aircraft A is skimming, through the water inlet 20 and into the mixer 10. Thus, motion of the aircraft A over the body of water provides the source of hydrodynamic forces which powers the mixer 10. The aircraft A also includes a tank T for storage of the water and polymer mixture M and doors D for dropping the water and polymer mixture M when the aircraft A has traveled to a firefighting location. Water W enters the float F along arrow B (FIG. 1) and water and polymer mixture M is dropped from doors D along arrow E.

While a single mixer 10 is depicted with a single float F active in directing water into the mixer 10 and onto the tank T, the aircraft A typically has two floats F and each float F can be fitted with its own pickup to receive water W thereinto, coupled to separate mixers 10 (or a common mixer 10) and then directed to a common tank T (or potentially separate tanks). The mixer 10 is preferably located along a line for the water W between the pickup in the float F and the tank T. As an alternative, the mixer 10 can be located within the tank T itself as depicted in broken lines by mixer 10' (FIG. 1).

In essence, and with particular reference to FIGS. 1-3, basic details of the mixer 10 are described. The mixer 10 includes a water inlet 20 located downstream from a source of water fed by a pickup on a float F of the aircraft A. The mixer 10 also includes a polymer inlet 30 leading from a polymer tank 34 or other source of polymer P. The water inlet 20 and polymer inlet 30 are each located upstream of a bend 40. This bend 40 includes at least one elbow and preferably includes a first elbow 42 and a second elbow 44. The water W passes with sufficient hydrodynamic forces through the elbows 42, 44 that polymer P added to the water W upstream of the bend 40 is thoroughly mixed and activated by the shearing forces encountered as the water passes through the elbows 42, 44 of the bend 40. A colorant inlet 50 is preferably provided downstream of the bend 40 which is fed by colorant C from a source of colorant, such as a colorant tank 54. Finally, a mixture M of water W and polymer P is discharged from an outlet 60 of the mixer 10 which then leads to the tank T.

More specifically, and with continuing reference to FIGS. 2 and 3, specific details of the mixer 10 are described, according to a first embodiment. In this first embodiment the mixer 10 is in the form of a fluid pathway defined by circular cross-section tubular members. The water inlet 20 is preferably a section of straight cylindrical pipe. Similarly, the outlet 60 is preferably formed of a similarly sized and shaped circular cross-section pipe. The water inlet 20 feeds into the open end of this cylindrical pipe providing the water inlet 20. The polymer inlet 30 is preferably located in the cylindrical side wall of this inlet pipe forming the water inlet 20. Water W passes through the water inlet 20 and polymer P passes through the polymer inlet 30. The polymer inlet 30 is preferably fitted with a line which leads to a polymer tank 34. This polymer tank 34 is most preferably located within one of the floats F of the aircraft A (FIG. 1) but could be located at other locations on the aircraft A.

The polymer 30 can be metered into the mixer 10 in a variety of different ways. In a simplest embodiment, an orifice is merely provided which allows the "Venturi Effect" to suck polymer into the mixer 10 to join with water W entering through the water inlet 20. A check valve can also be provided which is normally closed but which readily opens when the low pressure associated with the high velocity water W passing through the water inlet 20 is experienced adjacent the polymer inlet 30. Generally, the faster the flow rate of the water W the higher the rate at which polymer P is passed through the polymer inlet 30, so that a desired ratio of polymer P to water W can be achieved by merely selecting orifice sizes at the polymer inlet 30.

Alternatively, a dosing system can be provided which controls flow of polymer P through the polymer inlet 30. Such a dosing system could be automated, such as with sensors to measure water W flow rates and control polymer P flow rates through the polymer inlet 30 to match. Alternatively, such a dosing system could be at least partially manual, such as with an operator utilizing a switch or other manually operable control element to cause polymer P to be injected when desired and at a desired flow rate. Such a switch could also alternatively be opened by some passive actuator, such as a switch on the float F which opens when the float F is impacting a body of water, and which is otherwise closed. Multiple valves can be provided of different types depending on the design particulars of the particular system being implemented. If desired, a plurality of polymer inlets 30 can be provided to strategically place the polymer P where desired within the flow path of the water W.

The bend 40 preferably includes the first elbow 42 and second elbow 44 having circular cross-sections and diameters similar to that of the pipe forming the water inlet 20 and water and polymer outlet 60. These elbows 42, 44 are oriented in this embodiment within a common plane, but with orientations opposite each other so that the water W and polymer P must first turn in a first direction and then turn in a second direction opposite the first direction. For instance, if the first elbow 42 causes the fluid flow through the fluid pathway of the mixer 10 to turn upward from horizontal, the second elbow 44 causes the fluid flow to be diverted from upward back to horizontal. If the first elbow 42 causes the fluid flow to be diverted to the left, the second elbow 44 causes the fluid flow to be diverted to the right.

The elbows 42, 44 are preferably each 90° elbows. As an alternative, the elbows 42, 44 could have a lesser or greater degree of bend. The elbows 42, 44 are shown in this embodiment as directly adjacent each other. However, the elbows 42, 44 could be spaced by a straight cylindrical section therebetween having various different lengths.

The bend 40 benefits from maintaining a circular cross-section fluid pathway entirely therethrough. In this way, any debris which might be drawn through the water inlet 20 into the mixer 10 has a relatively high propensity to pass cleanly through the mixer 10. If any such debris should become trapped within the bend 40, such debris would relatively easily be removable, such as by disassembly of portions of the fluid pathway upstream of the water inlet 20, grasping hold of any such debris and removing it in a direction opposite the direction with which the debris entered the bend 40 portion of the mixer 10.

The colorant inlet 50 is preferably located in the cylindrical outlet 60 downstream of the bends 40. Colorant C is entered into this colorant inlet 50. The colorant C is routed to the colorant inlet 50 from a colorant tank 54. As with the polymer inlet 30, a simplest embodiment could merely have the colorant inlet 50 flow rate controlled by a Venturi orifice which is activated by the flow rate of fluids passing the colorant inlet 50. A check valve can also be supplied to keep the colorant inlet 50 closed until such fluid motion through the fluid pathway and passed the colorant inlet 50 is experienced. As an alternative, some form of dosing system or other control could be provided for the colorant inlet 50 which could have any of a variety of configurations generally matching the various options available for the polymer inlet 30, described in detail above.

The colorant tank 54 could be located anywhere upon the aircraft A, and is shown in an exemplary embodiment within a fuselage of the aircraft A (FIG. 1). The colorant C does not affect the fire suppressant capability of the water and polymer mixture M, but does allow fire fighting personnel to more readily view which areas have already been treated with the water and polymer mixture M to most effectively distribute the water and polymer mixture M at a firefighting location.

The mixer 10 and polymer activation method of this invention are further exemplified by alternative embodiments disclosed herein, and particularly in FIGS. 4-15. With reference to FIGS. 4 and 5, details of a single elbow mixer 110 are described. The single elbow mixer 110 is similar to the mixer 10 of the preferred embodiment except that the bend 140 is fed by only a single elbow 142. A water inlet 120 allows water W to be drawn into the mixer 110. A polymer inlet 130 is provided to feed polymer P into the fluid pathway along with the water W. The single elbow 142 is then encountered along the fluid pathway downstream of the polymer inlet 130 and water inlet 120.

A colorant inlet 150 is preferably provided downstream of the bend 140 through which colorant C can be introduced. A water and polymer mixture M then exits through an outlet 160. The elbow 142 in this single elbow mixer 110 embodiment is shown as a 90° elbow. This elbow 142 could have other degrees of bend, such as greater or less than 90° if desired.

Mixers which exhibit a bend with at least two elbows are considered to more efficiently mix and activate the polymer P with the water W. However, when sufficiently high hydrodynamic forces are encountered, and with particular polymers P which may require less elevated shear forces for thorough mixing and activation with the water W, such a single elbow mixer 110 is considered as a potentially feasible alternative embodiment for the mixer 10 and polymer mixing method of this invention.

With particular reference to FIGS. 6 and 7, details of a non-planar mixer 210 are described. The non-planar mixer 210 is similar to the mixer 10 of the preferred embodiment except that the first elbow 242 and second elbow 244 are not entirely planar in the orientation of fluid flow therethrough, but rather cause fluid flow to occur along lines which are non-planar to each other. In particular, a water inlet 220 and polymer inlet 230 feed water W and polymer P into the mixer 210 in a manner similar to that of the mixer 10 described in detail above. The first elbow 242 of the bend 240 bends the fluid pathway in a first direction and within a first plane. The second elbow 244 is downstream of the first elbow 242 and also causes the flow through the fluid pathway to bend within a second plane. This direction of bending of the second elbow 244 is oriented to cause the fluid to be diverted out of the first plane in which the fluid had resided when passing through the water inlet 220, past the polymer inlet 230, and through the first elbow 242. In one embodiment, where the first elbow 242 and second elbow 244 are each 90° elbows, the elbows 242 and 244 are oriented so that fluid flow downstream of the second elbow 244 is along a line and in the second plane oriented perpendicular to a line and first plane of the fluid flow before entering the bends 240.

The water and polymer mixture M then continues out of the outlet 260 past a colorant inlet 250 for introduction of colorant C. It is not necessary that the planes in which the fluids enter and exit the non-planar mixer 210 be perpendicular to each other, but rather such planes can be skewed relative to each other in non-perpendicular and non-parallel relative orientations. While the elbows 242, 244 are shown directly adjacent each other, some cylindrical section could be interposed therebetween.

With particular reference to FIGS. 8-11, details of a concentric mixer 310 alternative embodiment are described. The concentric mixer 310 includes an inlet section 320 which includes an inner tube 322 inside of an outer tube 324, with the inner tube 322 supported in its position within the outer tube 324 by standoffs 326. Preferably these tubes 322, 324 are concentric such that an annular fluid flow path is provided within the outer tube 324 and outside of the inner tube 322. A central circular cross-section flow pathway is also provided within the inner tube 322.

A polymer inlet 330 is provided which passes through the wall of the outer tube 324 and wall of the inner tube 322, so that polymer P is introduced into fluid flow within the inner tube 322. A short tube 332 allows the polymer inlet 330 to so pass through the annular outer flow pathway of the inlet section 320. Preferably, the standoffs 326 are provided as a set of three and work together along with the short tube 332 of the polymer inlet 330 to hold the inner tube 322 securely in place.

A bend 340 is provided downstream of the inner tube 322. This bend 340 in this embodiment is shown with a first elbow 342 followed by a second elbow 344, followed by a third elbow 346 followed by a fourth elbow 348. The first and fourth elbows 342, 348 are preferably 45° bend elbows. The second and third elbows 344, 346 are preferably 90° bend elbows. Each elbow 342, 344, 346, 348 is preferably oriented with alternating orientations so that fluid flow through the bend 340 is serpentine in nature.

The bend 340 resides within a mixing section 352 defined by an outer cylindrical wall 354 with an annular region 356 surrounding the bend 340. Flat end walls 355 define ends of this mixing section 352. A colorant inlet 350 is preferably oriented in a downstream one of these flat end walls 355. Some of the water W remains in the annular flow pathway and avoids the bend 340, passing instead directly into the mixing section 352 and taking up the colorant C therein before joining with the polymer and water mixture M which has been mixed within the bend 340. This embodiment is particularly advantageous where it is desirable for the colorant C to mix with the water W before the water W has encountered the polymer P. An outlet section 360 joins the two flow sections together before exiting of the water and polymer mixer M out of the outlet section 360.

With particular reference to FIGS. 12-15 details of a tandem mixer 410 are described according to an alternative embodiment. With the tandem mixer 410, an inlet section 420 is provided similar to the water inlet 20 section of the mixer 10 of the preferred embodiment described above. This inlet section 420 leads to a manifold 432. The manifold has the polymer inlet 430 passing thereinto. The manifold 432 feeds a left inlet 434 and a right inlet 436 which are oriented adjacent to each other. The left inlet 434 leads to a left bend 440. The right inlet 436 leads to a right bend 445. The left bend 440 includes a first elbow 442 and a second elbow 444. The right bend 445 includes a first elbow 446 and a second elbow 448.

These bends 440, 445 are preferably similar in size and shape and oriented directly adjacent each other. The polymer inlet 430 is preferably oriented precisely between the two bends 440, 445 so that some of the polymer P is routed with the water W into each of the bends 440, 445. These elbows 442, 444, 446, 448 of the bends 440, 445 are preferably oriented similarly to the elbows 42, 44 of the bend 40 in the mixer 10 of the preferred embodiment described above.

These bends 440, 445 are preferably located within a mixing section 452 into which the colorant inlet 450 is directed, such as on an outer flat wall 455 of the mixing section 452. An outlet section 460 is located downstream of this mixing section 452 for discharge of the mixture M of water and polymer along with colorant C out of the mixer 410. The outlet section 460 is preferably out of line with the second elbow 444 of the left bend 440 and the second elbow 448 of the right bend 445, so that further diversion of the fluid pathway occurs for further mixing of the polymer P with the water W and mixing with the colorant C before discharge of the mixture M out of the outlet section 460.

This disclosure is provided to reveal a preferred embodiment of the invention and a best mode for practicing the invention. Having thus described the invention in this way, it should be apparent that various different modifications can be made to the preferred embodiment without departing from the scope and spirit of this invention disclosure. For instance, various different sections of the mixer 10, while shown with a circular cross-section, could have other cross-sectional geometries. The various elements could be directly adjacent each other or spaced apart by intermediate structures and could be fastened together by adhesive bonding, welding, use of mechanical fasteners, or through other fastening methodologies. When structures are identified as a means to perform a function, the identification is intended to include all structures which can perform the function specified. When structures of this invention are identified as being coupled together, such language should be interpreted broadly to include the structures being coupled directly together or coupled together through intervening structures. Such coupling could be permanent or temporary and either in a rigid fashion or in a fashion which allows pivoting, sliding or other relative motion while still providing some form of attachment, unless specifically restricted.

What is claimed is:

1. An apparatus for mixing wildland fire suppressant polymer with water, comprising in combination:
    a source of high velocity water;
    a water inlet into a fluid pathway, said water inlet coupled to said source of high velocity water;
    a source of polymer;
    a polymer inlet into said fluid pathway, said polymer inlet coupled to said source of polymer;
    at least one elbow in said fluid pathway, said elbow downstream of said water inlet and said polymer inlet;
    said source of high velocity water having sufficient velocity to cause mixing of the polymer with the water by said at least one elbow;
    a mixed water and polymer outlet at an end of said fluid pathway downstream from said elbow;
    wherein said source of water includes an opening located on an aircraft, said opening positioned to cause water to drive into said opening and into said water inlet at said high velocity when said aircraft is in contact with a body of water while said aircraft skims over said body of water; and
    wherein at least two elbows are located in said fluid pathway downstream of said water inlet and said polymer inlet.

2. The apparatus of claim 1 wherein said elbow is a substantially 90° elbow.

3. An apparatus for mixing wildland fire suppressant polymer with water, comprising in combination:
    a source of high velocity water;
    a water inlet into a fluid pathway, said water inlet coupled to said source of high velocity water;
    a source of polymer;
    a polymer inlet into said fluid pathway, said polymer inlet coupled to said source of polymer;
    at least two elbows in said fluid pathway, said at least two elbows downstream of said water inlet and said polymer inlet;
    said source of high velocity water having sufficient velocity to cause mixing of the polymer with the water by said at least two elbows;
    a mixed water and polymer outlet at an end of said fluid pathway downstream from said at least two elbows;

wherein each of said at least two elbows is a substantially 90° elbow; and wherein said at least two elbows are located adjacent to each other.

4. The apparatus of claim 3 wherein said at least two elbows are oriented to redirect flow along said fluid pathway in different directions relative to each other.

5. The apparatus of claim 4 wherein said at least two elbows are located within a common plane with a first elbow rotating the flow in a first direction and the second elbow rotating the flow in a second direction opposite said first direction.

6. The apparatus of claim 4 wherein said at least two elbows are positioned to divert the flow out of a single plane, including said first elbow rotating the flow along the fluid pathway within a first plane and the second elbow rotating the flow along said fluid pathway in a second plane non-parallel with said first plane.

7. The apparatus of claim 1 wherein a colorant inlet is located in said fluid pathway downstream from said water inlet, and upstream of said mixed water and polymer outlet.

8. The apparatus of claim 1 wherein said fluid pathway includes at least two separate flow paths between said water inlet and said mixed water and polymer outlet.

9. An apparatus for mixing wildland fire suppressant polymer with water, comprising in combination:
a source of high velocity water;
a water inlet into a fluid pathway, said water inlet coupled to said source of high velocity water;
a source of polymer;
a polymer inlet into said fluid pathway, said polymer inlet coupled to said source of polymer;
at least one elbow in said fluid pathway, said elbow downstream of said water inlet and said polymer inlet;
said source of high velocity water having sufficient velocity to cause mixing of the polymer with the water by said at least one elbow;
a mixed water and polymer outlet at an end of said fluid pathway downstream from said elbow;
wherein said fluid pathway includes at least two separate flow paths between said water inlet and said mixed water and polymer outlet; and
wherein said at least two flow paths are concentric, including an inner flow path and an outer flow path, each said flow path fed by water from said water inlet, said polymer inlet located in said inner flow path.

10. The apparatus of claim 8 wherein said separate flow paths are parallel to each other with said polymer inlet located in a manifold upstream of a split where said separate flow paths commence.

11. A method for mixing wildland fire suppressant polymer with water, comprising in combination:
introducing a mixer having a water inlet into a fluid pathway, a source of polymer, a polymer inlet into the fluid pathway, the polymer inlet coupled to the source of polymer, at least one elbow in the fluid pathway, the elbow downstream of the water inlet and the polymer inlet, and a mixed water and polymer outlet at an end of the fluid pathway downstream from the elbow;
driving water at high velocity into said water inlet, the velocity sufficiently high to mix the polymer from the polymer inlet with water from the water inlet when the polymer and water pass through the at least one elbow;
providing the water inlet downstream of an opening in an aircraft;
flying the aircraft over a body of water;
contacting the aircraft with the water to position said opening in the body of water;
driving the high velocity water into the water inlet; and
identifying the fluid pathway with at least two elbows adjacent each other and oriented to cause fluid flow therethrough to bend in different directions.

12. The method of claim 11 wherein said providing the fluid pathway step includes orienting the at least two elbows oriented within a common plane with a first one of the at least two elbows rotating the water and polymer passing therethrough in a first direction and the second elbow rotating the flow passing through the second elbow in a second direction opposite the first direction.

13. A method for mixing wildland fire suppressant polymer with water, comprising in combination:
introducing a mixer having a water inlet into a fluid pathway, a source of polymer, a polymer inlet into the fluid pathway, the polymer inlet coupled to the source of polymer, at least one elbow in the fluid pathway, the elbow downstream of the water inlet and the polymer inlet, and a mixed water and polymer outlet at an end of the fluid pathway downstream from the elbow;
driving water at high velocity into said water inlet, the velocity sufficiently high to mix the polymer from the polymer inlet with water from the water inlet when the polymer and water pass through the at least one elbow; and
splitting the fluid pathway into a pair of concentric flow paths and introducing the polymer into an inner one of the concentric flow paths.

14. The method of claim 11 including the further step of splitting the flow through the fluid pathway into adjacent flow paths, each of said adjacent flow paths coupled to a common manifold downstream of the water inlet, with the polymer inlet coupled to the manifold.

15. The apparatus of claim 1 wherein said aircraft has a float and said opening is positioned on said float.

16. The method of claim 11 including the step of locating the opening in a float of the aircraft.

* * * * *